US008495732B2

(12) United States Patent
Guenthner

(10) Patent No.: US 8,495,732 B2
(45) Date of Patent: Jul. 23, 2013

(54) ENTERING AN IDENTIFIER WITH SECURITY IMPROVED BY TIME BASED RANDOMIZATION OF INPUT STEPS

(76) Inventor: Russell W. Guenthner, Glendale, AZ (US)

( * ) Notice: Subject to any disclaimer, the term of this patent is extended or adjusted under 35 U.S.C. 154(b) by 1025 days.

(21) Appl. No.: 12/316,771

(22) Filed: Dec. 15, 2008

(65) Prior Publication Data

US 2010/0153735 A1    Jun. 17, 2010

(51) Int. Cl.
*G06F 12/14*    (2006.01)
(52) U.S. Cl.
USPC .............................. 726/22; 726/27; 713/183
(58) Field of Classification Search
None
See application file for complete search history.

(56) References Cited

U.S. PATENT DOCUMENTS

| | | | |
|---|---|---|---|
| 5,394,471 A | 2/1995 | Ganesan et al. | |
| 5,428,349 A | 6/1995 | Baker | |
| 5,588,056 A | 12/1996 | Ganesan | |
| 6,209,102 B1 * | 3/2001 | Hoover | 726/18 |
| 6,980,081 B2 | 12/2005 | Anderson | |
| 7,065,786 B2 * | 6/2006 | Taguchi | 726/18 |
| 2002/0083347 A1 | 6/2002 | Taguchi | |
| 2004/0168068 A1 | 8/2004 | Goal | |
| 2005/0044425 A1 | 2/2005 | Hypponen | |
| 2005/0262555 A1 | 11/2005 | Waterland | |
| 2006/0037064 A1 * | 2/2006 | Jeffries et al. | 726/4 |

OTHER PUBLICATIONS 07 60035, FR, Filed Dec. 19, 2007, English Translation Attached, Jean-Yves Dujonc, and Jean-Pierre Vaslin.

* cited by examiner

*Primary Examiner* — Kaveh Abrishamkar
(74) *Attorney, Agent, or Firm* — Russell W. Guenthner

(57) ABSTRACT

A secure method, apparatus or computer program incorporates a method for entering private information such as a user identifier, password or other secret code comprising at least one symbol or character. According to method in one illustrated embodiment, the user selects characters for input starting from presentation of an initial suggested character, moving under user control to presentation of a user's desired input character, and then followed by the selection by the user of that presented character as a character for data input. The method includes randomizing the timing of the display and/or reaction time to user input so that the number and timing of the key presses required to select any specific desired character for input is made unpredictable. This makes it difficult during entry of information to determine by covert means what specific information is being entered.

11 Claims, 7 Drawing Sheets

ENTERING AN IDENTIFIER WITH SECURITY IMPROVED BY TIME BASED RANDOMIZATION OF INPUT STEPS

CROSS REFERENCE TO RELATED APPLICATIONS

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

BACKGROUND OF THE INVENTION

This invention relates to means for entering, on or into an apparatus, secure information such as passwords, user identification, personal information, secret information and the like. The invention has potential for utilization in devices and applications such as personal computers, portable computers, flash drives, security, cell phones, cryptographic devices, terminal devices, portable terminals, user validation, passwords, and encryption.

It is often required for security or identification reasons that a user of a system or an apparatus enters a password or user identification as part of validating a person's right to use the apparatus or system, or simply for logging purposes. A personal computer, a computer system, a piece of machinery or any electronic device are examples of such systems where security might be important or mandatory. Entering a password or user identification (such as a userid) typically involves entering an identifying sequence of characters and/or a password. Symbols or other identifying marks might also be entered either individually or in a sequence.

During entry of the userid or password it might be possible for a covert observer to discover the characters being entered by observing operation of the input mechanism. This covert observation could be accomplished in various ways, such as by visual observation of the keystrokes the user enters, or by electrical analysis of signals emanating from the input mechanism, wires associated with the mechanism, or other analysis of signals that are in some way indicative of the characters being entered on the input mechanism, even when the information itself is not being covertly observed. For example, it may be possible through analysis of electronic "noise" emanating from a keyboard to distinguish between one key stroke and another key stroke as the keys are pressed, and this may allow a covert observer to determine a password or to gain information which would help in guessing a password.

Thus, there exists a need to help prevent or completely prevent discovery of private information through observation of the entry, or to decrease the chance of allowing secret information to be discovered by observation or determination of user action during user entry of that secret information into a machine or apparatus such as a computer system.

One such approach is described in a US Patent Application with Publication Number 2005/0262555, by Inventor Amos P. Waterland and assigned to International Business Machines Corporation or Armonk, N.Y. This application discloses a method and system for secure password entry using an approach which defeats unauthorized keystroke logging during password entry. The method utilizes during password entry an approach which displays a password prompt as a changing stream of random characters. Further, the character suggested for selection is highlighted by displaying that character at a visibly detectable higher frequency. The approach is based upon a human visual system process called the "gestalt" effect. This approach has some disadvantage in that controlling the frequency of display requires use of certain types of display, and the circuitry and programming may be complicated by the need for a fairly high speed in changing the display (a frequency of 10 Hertz is suggested).

The Waterland patent application (US 2006/0262555) discusses further the need for the invention, and describes the current use of cryptographic approaches. Also described are several possibilities for keyboard logging through covert observation, active monitoring, passive monitoring, and with approaches using either hardware or software. Keyboard logging may be covertly implanted in a computer system without knowledge of the administrators or the users, and is a widely discussed subject in the art of computer security.

The need for the invention is described in Waterland US 2006/0262555 Patent Application as follows:

Ref paragraph [0004] Within a computer system or network of computer systems, maintaining the security of information and access to that information is important. A common method for maintaining security in computer systems is through associating a particular password with a particular user and requiring the user to submit the password to receive access to information within a computer system or network of computer systems.

Ref paragraph [0005] When setting up passwords, each computer system or network of computer systems typically assigns rules for the length of the password and the types of characters that must be included in the password. For example, it is typical to require a password to contain at least six characters and to include a mix of alphabetic characters and numeric characters.

Ref paragraph [0006] While passwords provide a level of security to protect access to networks, applications, and data, use of passwords as a security device is easily compromised by an attacker employing keystroke logging techniques. In general, a keystroke logging technique records the keystrokes an authorized user uses to enter a password, such that an unauthorized user may then enter the password of the authorized user to access secured networks, applications, or data. As examples, keystroke logging can be performed through hardware, software, active monitoring, and passive monitoring.

Ref paragraph [0007] As a first example, an unauthorized password logger can plant a hardware keystroke logging device inside a keyboard, attached to a keyboard cable, or interposed between the keyboard cable output socket and the computer keyboard input socket. The keystroke logging device records and timestamps all keystrokes typed at the keyboard. The unauthorized password logger can later recover the device and search the log for patterns which indicate an authentication. In a typical pattern, the string of characters typed after an authentication challenge is a password. For example, if the computer to which the keyboard is attached runs a UNIX based operating system, 'root.vertline-.su.vertline.ssh.vertli-ne.gpg' are patterns which result in an authentication challenge to which the user responds with a password. In another example, if the computer is part of an Internet cafe or other terminal available to multiple users, there is a pattern where the characters typed after entries of the form of "@hotmail.com" or "@yahoo.com" are typically the characters of a password. In yet another example, in computers which implement firmware-level authentication, there is a pattern where the first characters recorded after a long interval without activity are often the characters of the power-on password.

Ref paragraph [0008] One solution to protect against unauthorized placement of hardware keystroke logging devices is physically securing computer systems so that only authorized users have physical access to the computer systems. Realistically, however, enforcing physical security can be difficult, particularly in Internet cafes and other locations where it is advantageous to allow public access to computer systems.

Ref paragraph [0009] As a second example, an unauthorized password logger can implant keystroke logging software in the operating system or other programs of a computer system or network of computer systems. The keystroke logging software records and timestamps all or a selection of keystrokes in a log. In particular, the keystroke logging software can detect which program is receiving keystrokes and only record keystrokes received by particular programs. Like the hardware keystroke logging device, the unauthorized password logger can access the software keystroke log and detect patterns which tend to indicate entry of a password.

Ref paragraph [0010] One solution to protect against unauthorized implanting of a keystroke logging software is through security software installed in the operating system of a computer system that prevents remote intrusions which would serve as a conduit for unauthorized keystroke logging software. A limitation to security software, however, is that the software keystroke logging controller may be implanted in a manner so as to not be detected by the current security software. For example, an authorized user of a computer system may open an email attachment that surreptitiously installs the keystroke logging software to avoid the operating system security.

Ref paragraph [0011] As a third example, an unauthorized password logger can actively monitor keystrokes by watching over a shoulder or recording with a video camera the password keystrokes entered by a user. Keystrokes may also be actively monitored using a microphone to record the unique aural signatures of each key.

Ref paragraph [0012] As with the prevention of hardware keystroke logging device placement, active monitoring of keystroke entry can typically only be prevented through restricting physical access to computer systems and sweeping rooms for unauthorized microphone or video equipment. This security solution is limited, however, because many computers accessible to the public cannot be subject to this type of security.

Ref paragraph [0013] As a fourth example, an unauthorized keystroke logger can passively monitor keystrokes by snooping on electronic signals emitted by a computer system. Video display units leak electromagnetic radiation which can be used by an unauthorized logger to partially or fully reconstruct the image displayed on a computer system screen. In addition, other parts of a computer system emit signals which may be used to infer the operation of the component and access passwords. While passive monitoring can be avoided through the use of electromagnetic shielding that traps outbound electromagnetic radiation, this solution is limited because the shielding is very expensive.

Ref paragraph [0014] In addition to the four examples of ways unauthorized users can access passwords, a combination of hardware keystroke logging devices, keystroke logging software, active monitoring, and passive monitoring may be implemented to avoid current security systems. For example, a software keystroke logging program can configure the keyboard cable to act as a transmitting antenna and send out the log in morse code, which is detected by a local inexpensive radio receiver passively monitoring the computer system from afar.

Ref paragraph [0015] As cryptographic protection technology for entered passwords increases, keystroke logging becomes the ideal way for attackers to access passwords. As previously described, however, current methods of protecting against keystroke logging are limited. Thus, there is a need for a method, system, and program for preventing unauthorized keystroke logging that masks any patterns in password keystroke entry and avoids active and passive monitoring.

The above indicates the need for an approach that prevents determination of secret information through keyboard logging in addition to alternative solutions, with varying degrees of complexity in implementation.

BRIEF SUMMARY OF THE INVENTION

This invention is an improvement over a prior invention described in a French Application 07/60035 filed Dec. 19, 2007 invented by Jean-Yves DUJONC, and Jean-Pierre VASLIN titled:

Procédé de saisie d'un identifiant, dispositif de saisie et programme d'ordinateur associés, et dispositif de traitement de données comprenant un dispositif de saisie.

This French patent application relates to a method and an associated device for entering user desired private information into a machine or apparatus such as a computer system, or electronic device. The private information might be a user identifier, a password, or possibly something like a bank account number, or banking related information such as check numbers or check amounts. The referenced application is based upon utilizing an input method that requires the user to input information using multiple pushes of a button or buttons, or in the alternative the turning of a wheel. The user input causes the selection of a character for potential input to "move" from one character to another through a "set of characters" with the currently suggested character for data entry being presented as a choice to the user. The user can then "validate" the character currently presented as a desired input character to be entered.

The referenced French patent application describes the method as including a step for randomizing the number of input keystrokes necessary to enter the information, with this randomization accomplished by randomizing selection of the initial character presented to the user. With a random starting point, the number of keystrokes to "move" from the initial character to the user desired input character to be entered is variable, and therefore covert observation of the number of keystrokes is not useful in determining the user chosen ("validated") input character being selected for entry.

An alternative method of entering private information according to the patent application includes the use of a wheel or button that causes selection of potential characters for input to move repeatedly from one character to another by continuing to hold the wheel or button for some determined period of time. One exemplary method would be to begin with one specific selected character that is displayed, and then change the selection of potential input characters for display at some fixed rate, and to keep changing the selection as long as the button or wheel was held, thus allowing for selection of any character from a set of characters.

With a fixed or predictable starting point (initial character) and a fixed rate of changing the potential characters, progressing from an initial character to a desired character would be accomplished by holding the button or wheel for some predictable amount of time. Thus, a covert observer could potentially determine the character selected by observing the amount of time the user holds the wheel or button for each character entered.

The method of the present invention while still allowing for a predictable starting (or initial) character to be used, provides additional protection of privacy. For example, it may be most convenient for the initially suggested character for a string of alphabetic characters to always be the character "A" or if the string of characters is restricted to be numeric, then to always initially suggest the numeric character "0" (zero) or "1" (one).

The method of the present invention provides an improvement over the approach disclosed in the cited prior art including the referenced French patent application and the IBM patent application, which helps prevent a covert observer from determining private information being entered. The method of the present invention introduces the concept of randomizing the time required for the user to move from an initial suggested character to a specific desired character in order to make the user actions for entering the user's desired information unpredictable. This method is accomplished by randomizing the timing of certain aspects of the method for first displaying an initial character and then moving or changing the display of characters presented. For example, if the rate of changing the potential characters was varied randomly, the determination of the finally determined character to be entered would not be as easy because the time required to move from the initial character to any other character would be random.

It would also be beneficial relative to security from covert observation to vary the length of time from when a user presses the button or wheel until the changing of the characters starts, or to add or introduce some random hysteresis to the movement of characters so that the movement might stop immediately or drift or extend further for a short time. Another randomization technique that could be utilized by the method of the present invention would be to begin changing selected characters at some random rate as soon as the initial character is displayed. All of these randomization techniques help achieve the purpose of the invention which is to introduce unpredictability into the user input actions required in order for him or her to enter a desired string of characters.

Other similar techniques for randomizing the input method of the present invention could be devised in ways such that observing the amount of time a key is depressed, or the number of times a key was pressed is no longer indicative of the finally chosen character to be entered as user information.

This randomized approach for selection and display of characters has the advantage of allowing the initially selected character to be a fixed or deterministic character while still providing increased security from covert observation. It would still be advantageous however to provide for a random initial character in order to make determination through covert observation even more difficult, and essentially impossible.

It is noted that covert observation of the user input may not be limited to sight, but could also be accomplished by covert electronic monitoring, analysis of noise due to electrical switches or in other ways that might help a covert user gain knowledge of the keystrokes or some pattern of user input.

It is further noted that the method of the present invention can be incorporated in other schemes of data entry for which improved security is desired. For example, entering a combination into a wall safe with an electronic entry apparatus might be made more secure by providing for randomization of the timing of button pushes required to enter characters or numbers as a combination. The unlocking apparatus could present numbers in a sequence with randomized timing of the presentation so that covert observation of the timing of a user choosing a presented number would not be indicative of what the number was.

Using numbers for a password or combination is particularly suited to application of the method of the present invention because if only the numbers zero to nine are allowed as the possible set of input characters, then it does not take long to present all 10 possibilities at each input step. Even if they are presented in order, the randomization of the time or frequency of change of the numbers while waiting for the user to signal a choice would hinder a covert observer from determining the number chosen.

The subject matter of the invention is particularly pointed out and distinctly claimed in the concluding portion of the specification. The invention, however, both as to organization and method of operation, may better be understood by reference to the following description taken in conjunction with the subjoined claims and the accompanying drawings.

DETAILED DESCRIPTION OF THE INVENTION

Figure 1:
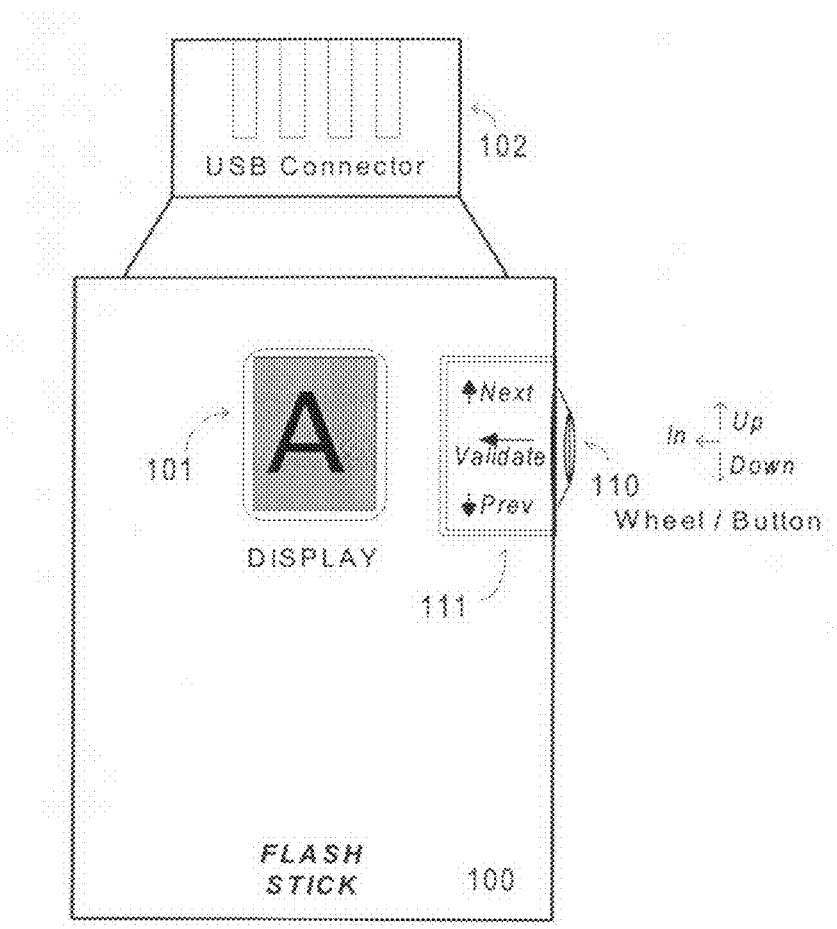
FIG. 1 is a diagram showing a USB (Universal Serial Bus) Flash Memory "stick" which includes apparatus suitable for providing user input.

The invention will be better understood and other characteristics and benefits will emerge from the reading of the following description of an illustrated embodiment for implementing an identifier input method according to the present invention, and further in an associated device.

As previously mentioned in conjunction with the referenced French patent application, there is described a device for entering an identifier comprises means for entering a character, such as:

a) a means for suggesting a character for selection by moving within a set of characters displayed to the user from an initial character, and b) a means for selecting (validating) the currently suggested character.

An input device constructed according to the teachings of the present invention differs from the previous described known input device in that it further comprises a means for randomizing as a function of time, the display of a suggested character for data entry and/or randomizing the timing of movement between successive presentations of suggested characters for data entry.

The input device utilized by the present invention may also comprise an apparatus with a memory to remember a character that has been suggested for data entry by the apparatus and selected by the user, and for assembling a string or set of characters intended as user input.

In a first example, the means of character suggestion and means of character selection are accomplished through the use of a keyboard including a navigation key or keys that guide an apparatus to display suggested characters for data entry within a set of possible or eligible characters and a "select" key to validate or select a suggested character as a desired user input character to be entered. This keyboard, for example, can be used as part of a data storage device or a communication terminal whose access is secured by an identifier or password. When depressed, the navigation key may instruct the apparatus to begin displaying characters for potential selection from within the set of possible characters. Movement from one character to the next occurs at some rate or changes at some interval as long as the navigation key is held or is continued to be depressed. When the navigation key is released by the user, the changing (or movement) between potential characters is stopped, and the last suggested character is presented continuously for data entry. This allows the user to "validate" or "select" the currently suggested character for input as part of the private information being entered.

In yet another example of an illustrated embodiment of the present invention, the means of selection and means of validation are accomplished through the use of a wheel that can be turned in two directions, allowing movement to begin in one of two directions among the set of eligible characters and stopped when the wheel is released, and then further allowed to be pressed in a third direction or in other manner to select (validate) a suggested character for data entry. The method of the invention can therefore be used to further improve the existing TRUSTWAY PPS key at little additional cost.

In yet another example according to the present invention, the means of validation is a detector of inactivity of the means of selection for a predefined time. After selecting a character for data entry, the user waits. At the end of a predefined time (20 or 30 seconds for example), the inactivity detector validates the selected character for data entry. This allows the input of the identifier or password to be accomplished using the action of only two keys, or even with just one key if the suggested characters were displayed in round-robin fashion. This approach coupled with a randomization of the time between changing of the suggested character(s) makes it quite difficult to ascertain the character finally selected (or chosen) for input data entry based upon observation of a user's keyboard activity or actions.

The means of display can also take various forms, depending on the planned application and/or the size of the overall device into which the input device is incorporated.

In one example of the illustrated embodiment for means of display it is suitable to show a single character that is either the initial character or the currently suggested character (the initial character is the first character displayed as a currently suggested character). In another example, the means of display is suitable to display the set of characters or a part of the set of characters and to emphasize or mark, with respect to the other characters in the set, either the initial character or the suggested character. The emphasis may be achieved, for example, by highlighting or underlining the suggested character or the initial character.

With reference to the Figures of the drawing, FIG. 1 is an illustration of a Flash Memory stick 100 (or "Flash Stick") which includes a mechanism providing for user input 110 and a display 101 which is suitable for use in an illustrated embodiment of the invention. In FIG. 1, a Flash Stick 100 with a USB connector 102 is shown. The Flash Memory Stick has a "wheel" switch 110 suitable for turning or pressing by the user. A user can turn the wheel "up" or "down", and can push inward on the wheel. As marked on the legend 111 on the surface of the Flash Stick device, pushing the wheel "up" signals "next", turning the wheel "down" signals "previous" ("prev") and pushing inward signals "validate". In this illustrated embodiment of the invention, pushing the wheel up starts movement from the currently suggested (and presented) character to the next and to the next repeatedly until the wheel is released. "Movement" (changing the suggested character for data entry) ceases when the wheel is released, and the last suggested character for data entry remains displayed. Pushing the wheel up again restarts the change in character suggestion from the current character suggestion, and pushing the wheel down changes the character suggestion within the set of possible or eligible characters in the "opposite" direction. That is, it reverses the order of character presentation.

The USB port 102 is intended for connection to computer apparatus which will utilize the Flash Stick 100 for flash storage. The Flash Stick device 100 as illustrated in FIG. 1 is a portable device. A Display 101 is used to display a currently suggested character, such as an "A" in the illustration. Turning the wheel "up" would move the selected character to a "B", and if the wheel were turned further or continued to be turned the apparatus would move the suggested character being displayed to a "B", and a "C" and a "D" and so on. Turning the wheel down would reverse the effect, and the selected character would go back from a "D" to a "C" to a "B" etc. At the end of the alphabet, or at the end of the legal characters allowed for selection, the selection could optionally wrap around or stop at the end. Determining and ordering of a list or set of eligible characters could be specified in many ways as could be devised by one skilled in the art. In similar manner, a toggle switch or buttons could be used to signal the desired changing of suggested characters for data entry, and selection (validation) of the currently suggested (and presented) character.

Figure 2:
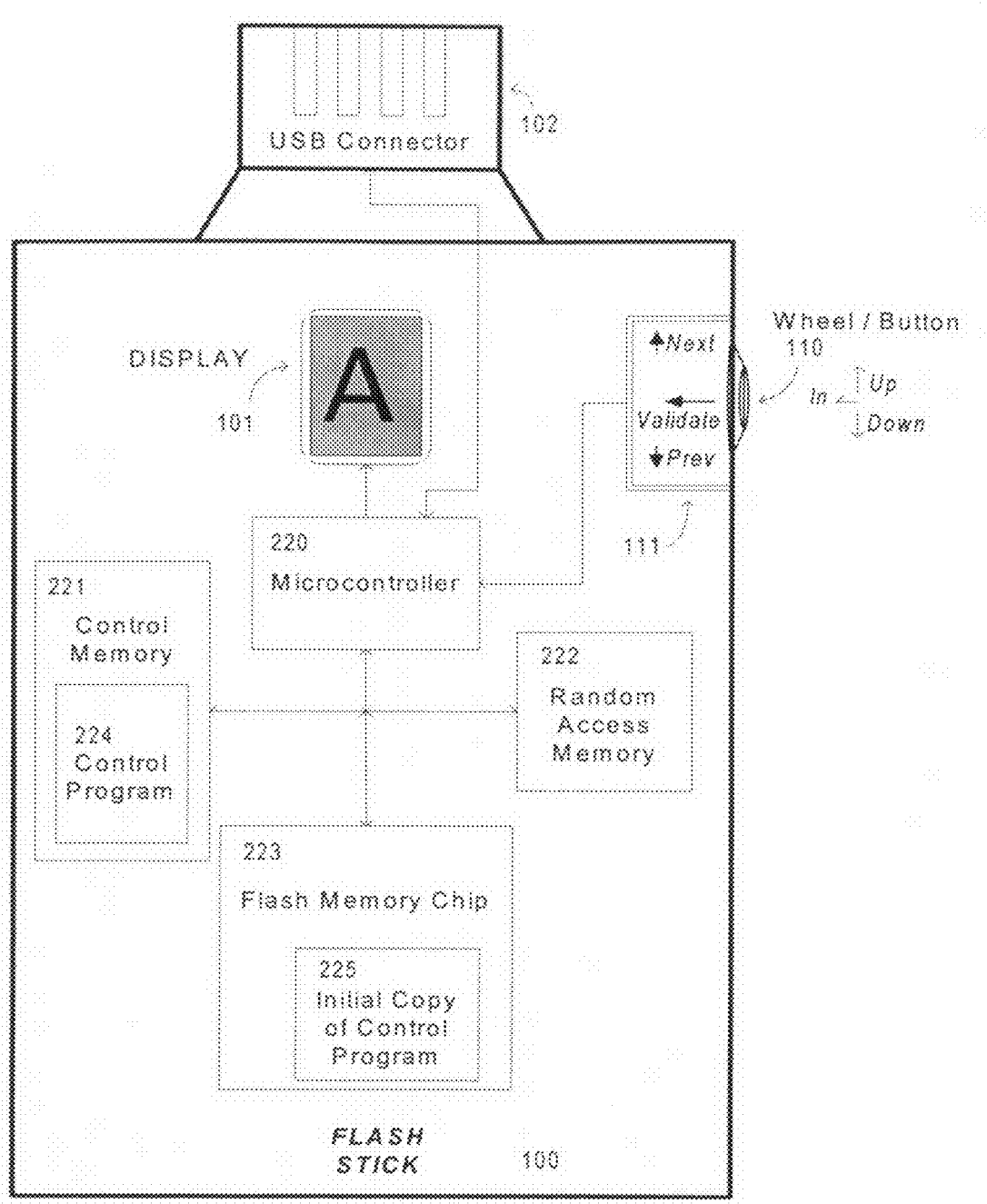
FIG. 2 is a diagram showing a Flash Memory "stick" which includes an input wheel and a display and also illustration of apparatus internal to the device shown as comprising a microcontroller, control memory, memory storage and flash memory.

FIG. 2 includes further illustration of some key components of a Flash Stick apparatus or device 100 of the illustrated embodiment of the present invention shown in greater detail. In FIG. 2, the Flash Stick 100 device (or apparatus) includes a USB connector 102 for connection of the device to a computer or other USB receptor. On the face of the device is the display 101 which displays a character to the user which can be "validated" (selected for inclusion in the data or private information being entered). A wheel/switch 111 provides input to a microcontroller 220 that acts as the central control mechanism for the Flash Stick device 100. The microcontroller 220 has a control program 224 contained in a control memory 221, and temporary storage provided by a random access memory 222. The control memory 221 and random access memory 222 may be combined, and stored control program 225 may be stored also in the flash memory 223. Control memory 221 may be initialized from the flash memory 223 with a copy of the control program, or from other means of permanent or semi-permanent storage. The control program 224 in flash memory 223 could also be contained/stored and run from the flash memory 223 itself. The Flash Memory 223 serves as storage for desired data, and is accessible under control of the control program 224 through the USB connector. For security reasons, there is typically no direct access to the flash memory 223 or random access memory 222 without control interaction by the microcontroller 220. The control program 224 in conjunction with the random access memory 222, and optionally the flash memory 223 can be programmed to accept user input from the wheel switch and using the display 101 to interact with the user. The display 101 is illustrated as displaying just one character, but could optionally display a plurality of characters, numbers, and other symbols or punctuation.

The Flash Memory 223 storage can be partitioned into regions accessible only by the microcontroller 220 for control program purposes, and into another storage region for access through the USB port. The Flash Memory 223 storage can be used for storage of legal identifiers in either plain or encrypted form. In order to perform entry of identifier or password, the control program 224, stored in control memory 221 in the illustrated embodiment includes code for forming a random initial character and for displaying that initial character on the display 101. The control program 224 would include coded instructions for observing or for signaling notification of receipt of user input from the wheel 110, and would control the display of the currently suggested character on the display. When a specific suggested (and currently displayed) character was chosen (selected or validated) for data entry by pushing inward (towards the center of the flash stick apparatus) on the wheel, the character is then added to the identifier, either by appending, or by placing it in an appropriate position within the identifier.

Figure 3:
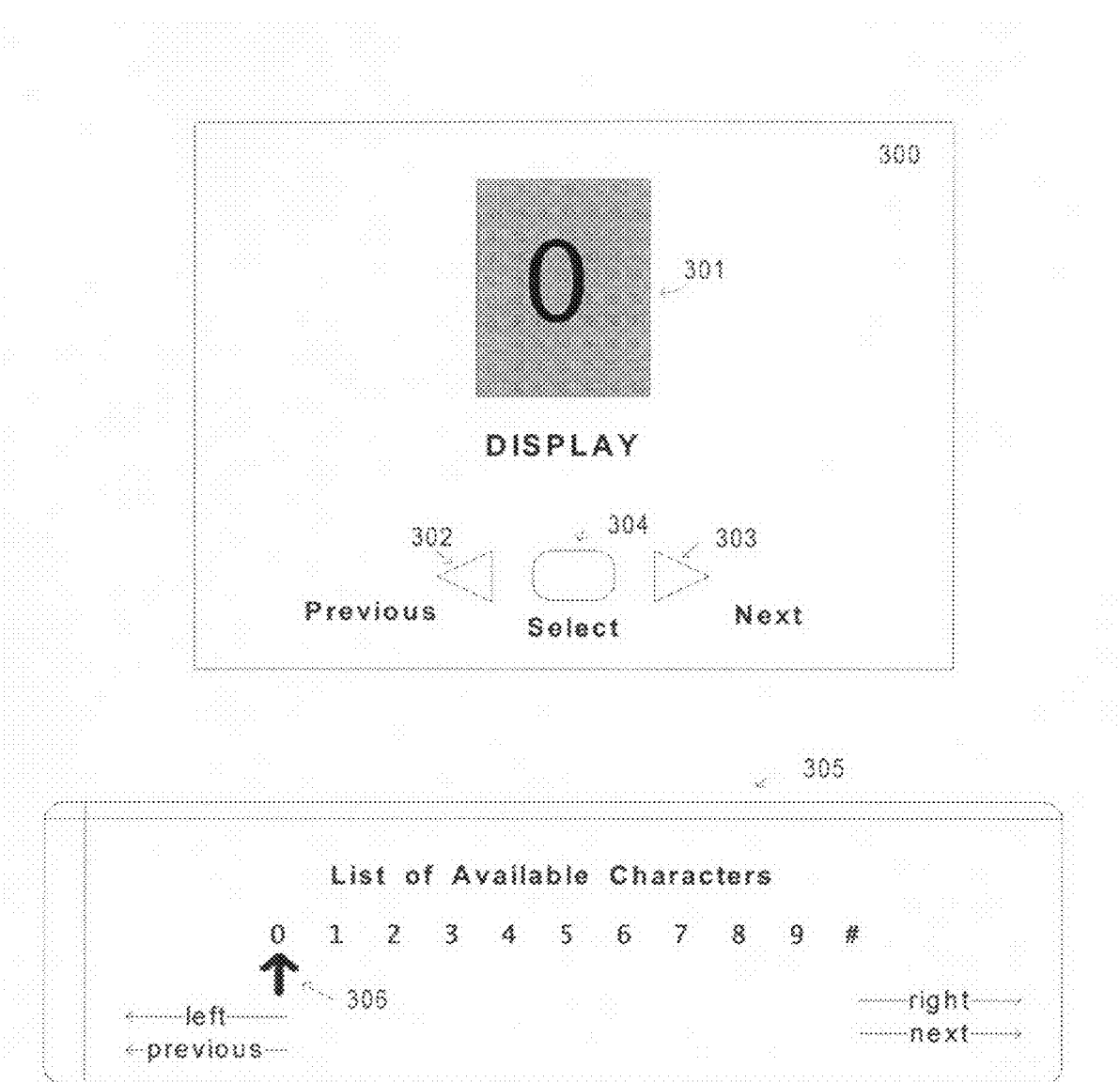
FIG. 3 is a diagram illustrating an exemplary user input apparatus which could be used in an illustrated embodiment of the invention. The user input apparatus in this Figure includes three switches for use by the user in moving between suggested characters and for selection of a specific suggested character desired as input ("validation").

FIG. 3 is an illustration of a user input apparatus which will now be used for a further discussion of an illustrated embodiment of the present invention. The user input apparatus 300 includes a display 301, and three buttons 302, 303, and 304. The buttons are labeled "Previous" 302, "Next" 303, and "Select" 304. The user input apparatus as shown will be used to illustrate entering a numeric user "Identifier". These same or similar steps might also be user to enter a user password or other "secret" information. The buttons serve as a means for a user to provide signals to the control program of the apparatus, those signals comprising choices by the user such as the user's desire to change the suggested character, or to choose a currently suggested character for input or data entry. The buttons can also be used to signal completion of a data entry operation. In this illustrated embodiment, the Next button, when pressed, signals to the apparatus that the user desires to begin changing the suggested characters in an "upwards" or "right" or "next" manner. The "Previous" button, when pressed, signals to the apparatus to change selected characters in a "downwards" or "left" or "previous" manner.

In FIG. 3, in a block shown below the input apparatus also includes a block with a "List of Available Characters" (eligible characters) 305 which in this example denotes the ten numeric digits from "0" to "9". In this example, an eleventh "character" which is "#" (number sign) is also provided in the list of available characters which is used as an indication or signal by the user, to the apparatus, that entry of the identifier is complete. (Entry by the user of a number sign is commonly used in telephone data entry systems to signal the completion or end of a numeric entry).

A control program, contained in a control memory of a device which includes this user input apparatus, is programmed to signal to the display unit commands to first display a suggested entry character (numeric digit in this example) between "0" and "9". For the first suggested character (before any numbers or characters have been entered) the number zero "0" would be a logical starting position. After a number has been entered, the choice might be to either leave the suggested number at the current location (the number just entered or chosen), or another alternative would be to return to the original first suggested character ("0"). In the Figure, a "marker" is shown as an arrow 306 pointing within the List of Available Characters 305 to the zeroed (first) character which is the numeric digit "0". If the user wanted to enter ("validate") "0" as a character in the identifier, the "select" (Validate) key could be pressed immediately.

It might also be desirable, in the application of one of the concepts utilized by the present invention, not to display any characters until the user first presses the next or previous button and optionally to pause for a random time delay after the pressing of any button before suggesting or displaying the first or any subsequent character for data entry. The insertion of a random time delay before the apparatus/input device presents or displays any selected characters for data entry would prevent a covert observer from determining what was the entered character, based upon observing the length of time the buttons were held down. If the first suggested character ("0" in this example) was not the desired character, then the "Next" 303 or "Previous" 302 buttons would be pressed. If the "Previous" button is pressed, the selected character is changed by decrementing an index number by one, which in effect moves the selected character one position to the left, and this new character is then displayed for "validation". Given that a "0" was being displayed as the currently suggested character for data entry, then holding down the button would increment the index and step through "1" then "2" then "3" and so on. Actual denotation of left, right, up, down, next or previous, or other directional concepts could be reversed or expressed in other ways or for different applications, or as might be designed by one skilled in the art.

When the end of the identifier is reached which might correspond to reaching a maximum number of characters, this signals that the entry of the identifier by the user is complete. The user might also signal the control program that the identifier is complete by selecting a specific character such as "#" which is not allowed to be selected as part of the identifier. It might also be appropriate to simply to cause the input device to pause for some period of time longer than that normally needed to validate a character selection, and use this longer pause to indicate that entry of the identifier has been completed. If identifiers are sufficiently long so as to preclude guessing, the end of the identifier might also be recognized by simply checking for a match against known identifiers after each successive validation of a selected character occurs. Other ways for determining the end of identifier or password entry would be apparent to those skilled in the art.

The randomization of display with the apparatus in FIG. 3 might be accomplished in other ways. Providing a random time interval between changing of the suggested characters, or random "acceleration" of the change in the amount of time that as a user input button is held would provide both unpredictability in the selection process and prevent a covert observer from determining what data has been entered.

Figure 4:
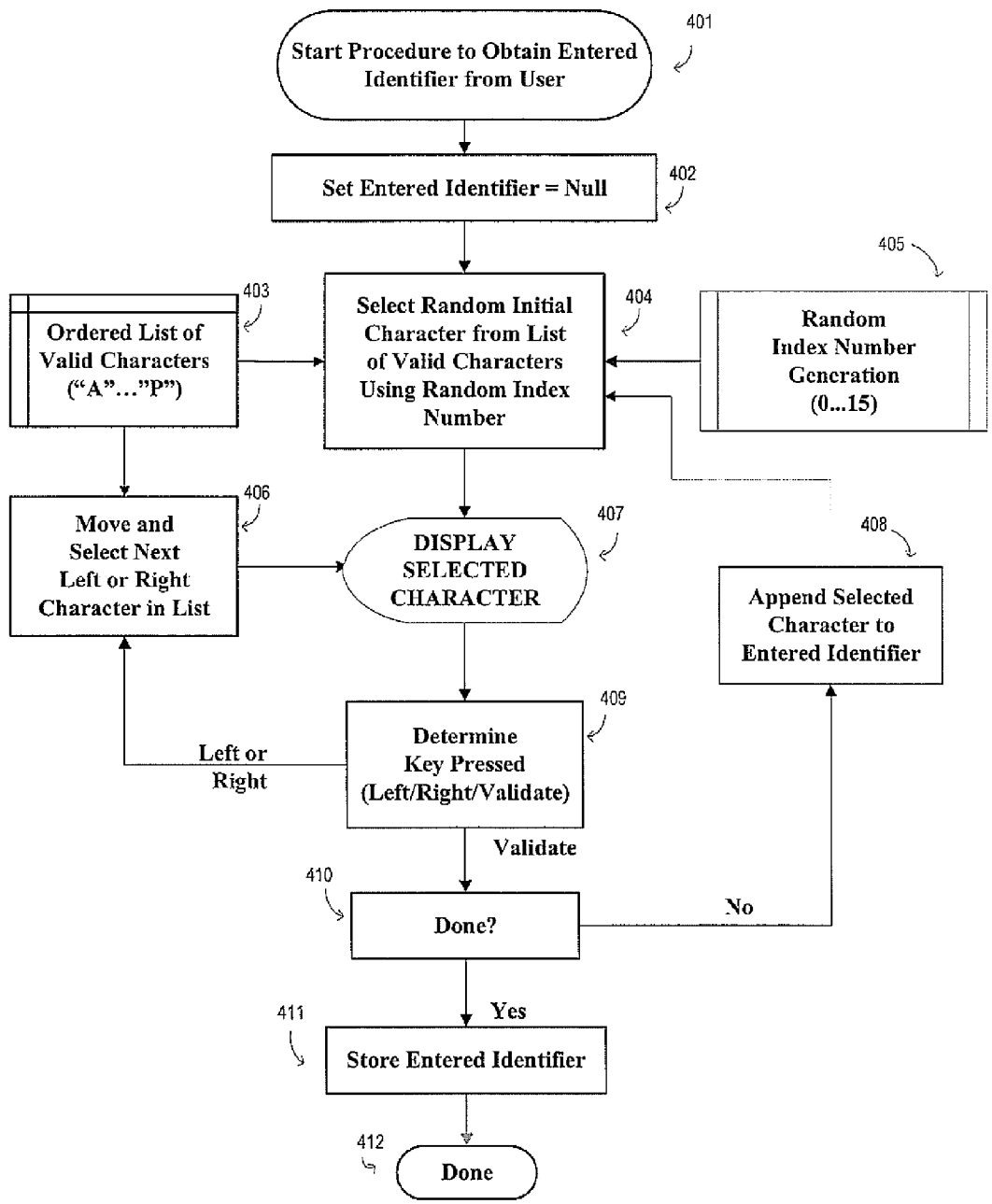
FIG. 4 is a flow chart illustrating steps of a method used by the present invention for controlling an input apparatus that provides for entering sequential characters of an identifier comprising at least one input character and which is made more secure from covert observation by randomizing the initial character selection which is one illustrated embodiment of an invention described in the previously mentioned Jean-Yves DUJONC, and Jean-Pierre VASLIN Patent Application.

FIG. 4 is a flow chart illustrating the steps of a method of the prior art for obtaining user input of a user identifier, which could also be a password, or any other "secret" code or information. This flow chart illustrates the steps carried out under the control of a control program stored in control program memory of an input apparatus in conjunction with a microcontroller for controlling a display and having input from a wheel or keyboard as in FIG. 2 and FIG. 3. In this example, the input information to be provided is an "identifier" or "userid" which is typically a small number of alphabetic characters typically six to possibly 20 characters. There is no real restriction on the length of a userid other than limitation of convenience, and similarly there is no real limitation on the number of legal characters or symbols allowed for use as characters in the identifier.

The steps of the method are shown in the diagram of FIG. 4 as beginning with a start step 401 followed by a step 402 of setting the "identifier" to a null string, (assuming that the user has not yet entered any information). An "Ordered List of Valid Characters" step 403 is typically predefined and provided for reference, and includes all of the legal characters allowed for use as characters in the identifier. The list is typically "ordered" meaning that it would be arranged in a sensible order so that given a current selection of a character the user might intuitively or from background knowledge know what the next character would be, either as the "next" character or as the "previous" character in the ordered list. The best example is the normal order of the characters in the alphabet, "A" to "Z" and then "0" to "9". The alphabet can also of course include small and capital letters and other symbols.

An "initial character" is selected in step 404 as the first possible input character for data entry. The selection of the initial character is made "randomly" from the "Ordered List of Valid Characters" using a generated random number 405 utilized as an index into the list. An initial random character might also be generated directly if that were simpler or provided implementation advantages.

Once the initial character is chosen, it is displayed in step 407 and the input mechanism then waits for user input. User input in this illustration is provided by three keys, those keys signaling "Left", "Right" or "Validate". "Next", "Right" and "Validate" might also be described as "Next", "Previous" and "Choose". Other descriptive terms could be obviously applied. Determination of which key is pressed in step 409 establishes whether to move selection of the displayed character to the "left" or "right" 406, that is, which "direction" to move in the ordered list of valid characters. The next selected character is then displayed in step 407 and the input mechanism then waits again for further user input.

Whenever the user observes that the desired character is displayed for use as the next character in the identifier being entered, then he or she presses the button signaling "validate". As selected characters are "validated", they are appended in step 408 to the "entered identifier". When the user completes entering the identifier, the user must signal in some way that he or she is done (step 410) such as through entry of a special character, by pausing for a long time, or through other convenient ways that could be devised. The identifier might also have been established as being of a fixed length so that the number of characters "validated" would determine when entry of the identifier was complete. Once "done", the character string which is the complete "entered identifier" is stored for use in verifying correctness of the userid/identifier/ password or whatever is being entered. The steps of user entry are then complete (as shown by step 412).

Figure 5:
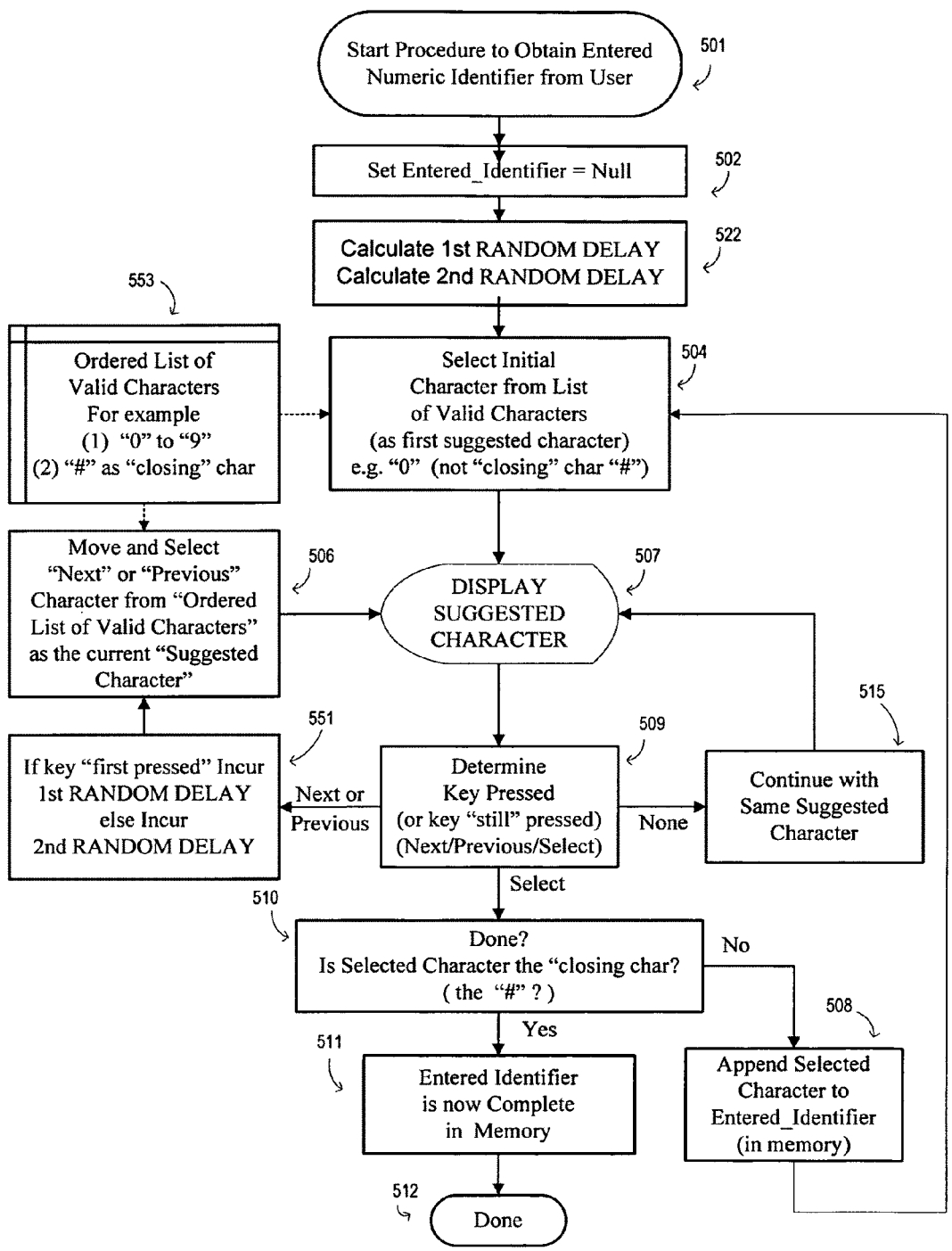
FIG. 5 is a flow chart diagramming steps of the method of an illustrated embodiment of the present invention that controls an input apparatus during data entry to provide enhanced security during the data entry by including additional or alternative randomization in the required timing of key presses or key movement to achieve the user's desired input.

FIG. 5 is a flow chart diagramming the steps of a method according to an illustrated embodiment of the present invention for controlling an input apparatus that enhances security of the input process. The steps shown in FIG. 5 are similar to those shown in FIG. 4 in that data entry as might be performed by the user is done in a similar manner. In FIG. 5, there is no step illustrated that provides for randomization of an initial character for presentation to a user. FIG. 5 shows steps of a method according to an illustrated embodiment of the present invention. The steps of the method as illustrated provide for randomization of the timing of the display of suggested characters and any resultant user selection of characters for input. This randomization of the timing of displaying any specific character results in the resultant randomization of the timing and/or number of key presses required for the user to choose characters during entry of private information. In FIG. 5, the step 405 shown in FIG. 4 which is the random selection of an initial character is omitted. This step is optional and could be incorporated into the method of the present invention for further increased security. A decision as to whether multiple steps of randomization would provide beneficial enhancement of security is a matter of design choice.

In the illustrated embodiment diagrammed in FIG. 5, the pressing of buttons or use of a wheel mechanism by a user signals to the control program of the apparatus or input device that the user desires a different character than that which is currently suggested for data entry and that the changing of the suggested character should begin. In this illustration, following the pressing of a key or wheel, the changing of the suggested character for data entry begins and continues through an ordered sequence of possible or eligible characters until the buttons or wheel are released. As the suggested characters are presented to the user, the user continues to hold down the key or wheel until the desired character is presented for data entry. If the user releases the key, the movement (changing) of presented characters is stopped. If the user presses the key or wheel again, the movement of presented characters restarts where it left off. Once the user's desired character is presented (suggested) for data entry then the user can stop and "select" the currently suggested character for input as a part of the entered private information. Selection of the suggested character can be by pressing the wheel inward (instead of up or down). A key might also be used for signaling selection.

It is noted that the presentation of characters for selection from an ordered set of possible or eligible characters is for illustrative purposes only. The characters could be presented in random order, or any order whatsoever, and still achieve the security provided by method of this present invention. Use of a random order, or arbitrary order might make finding and selecting the desired character less convenient. For a short list of possible or eligible characters, such as a numeric identifier, the inconvenience would be slight, and presentation of a random character from the set of possible characters might provide even more security in preventing determination of user information from covert keystroke logging.

In this illustration, FIG. 5, the input information is a numeric user identifier. The steps of the procedure followed by the apparatus/input device to obtain a numeric identifier from the user are as follows. The procedure begins at step 501 with the steps of initialization 502 and 522 by the control program. This includes initialization of variables related to program control such as setting the entered identifier to a null string in step 502 and calculating two random values of delay in step 522 to be used in later steps. The entered identifier is set to null because at this point in the procedure no data has yet been entered by the user. Two random values of delay are calculated to be used later, with the method of calculation of the random numbers being easily determined by a programmer skilled in the art. The "1st Random Delay" is intended to be used as a period of delay time from when a user pushes a button until the suggested characters for data entry begin changing. The "2nd Random Delay" is to be used to affect the rate of change of suggested characters once they start changing. These values could be calculated elsewhere in the procedure with the same or similar effect. The order of steps in this FIG. 5 are for illustration only, and could be changed significantly while still achieving advantages of the method of the present invention.

Once the initialization by program control step 502 is completed, an initial suggested character in step 504 is chosen from the list of allowable or eligible characters as indicated in step 553.

In this illustration, the allowable characters are the numeric digits from "0" to "9". These are the characters which the user is allowed or eligible to be entered as part of the numeric identifier being requested from the user. Once the user input process is begun, an additional character or characters may also be allowed for presentation as a suggested character for data entry to provide other control functionality such as "done" or "start over" or "cancel" which may or may not be appropriate for use as the very first suggested character. In this illustration only the characters "0" to "9" are allowed or permitted to be entered.

The suggested character from step 504 is then displayed as indicated in step 507 to the user and the apparatus then waits for input as indicated in step 509 in the form of a key being pressed by the user. A timeout mechanism, not shown in this figure, might also be incorporated into the apparatus for aborting incomplete user input when a user does not provide any input for some reasonable period such as more than ten or twenty or thirty seconds, as might be decided when programming the control apparatus, or even made variable as a user or device parameter.

The apparatus determines which key is pressed by the user in step 509 and then responds to that specific input. When "next" or "previous" key is first pressed, meaning that the user wants to begin moving from the current suggested character to the desired character for data entry, then a 1st Random Delay is incurred in step 551, before beginning the movement (changing) of suggested characters. With duration of this delay being random, a covert observer has no way to know exactly when the suggested characters begin changing, and therefore has no way to know what the currently suggested character is at any specific time during the following entry process.

Once the next or previous keys have been pressed and "movement" (changing) of characters has begun, then a 2nd Random Delay of different duration than the 1st Random Delay is incurred as indicated in step 551 in order to control the rate of change between suggested characters for data entry. This further randomizes the user input actions required to select any desired character for data entry and so provides further security from determining entered information by covert observation. In implementation, the 1st Random delay might typically be in the range of one to three seconds, and the 2nd Random delay might be in the range of one-eighth second to one second. These values are not limitations, but are estimates as might be suggested from the point of view of user convenience in operation. The selection of too small of a value for the second random delay value might result in the suggested character changing so quickly that it is difficult to select one specific character for input. The selection of too large of a value for the second random delay might make the input selection take too long. The selection of too small of a value for the first random delay makes the randomization a little less effective by starting the changing of suggested characters after a fairly short period of time. The selection of too large of a value, such as more than just a few seconds, might mean that the user would feel it takes too long to get started on the selection process, and thus annoyingly long to accomplish entry of the desired private information.

If no (none) keys are being pressed, then the currently suggested character is not changed as indicated in step 515, and any movement from one suggested character to another is stopped. If the previous or next keys are again pressed as in step 509 then movement after suitable delay period (optionally again the first random delay) is again begun (steps 551 and 506).

As an overall consideration, it is desirable to make input process smooth and easy to use for the user, while still making the timing of the actual key presses needed to enter the private information unpredictable.

If the "select" key is pressed, then first a check is made to see if there is indication by the user that data entry is complete. This might be through user selection of a special character such as a "#" character that is used to signal "done" as indicated in step 510 to the control apparatus. If not "done" then the currently suggested character is appended as indicated in step 508 (or stored or added somewhere) to the already entered information (if any) and typically stored as a string in memory.

If the user does signal "done" through some mechanism such as selecting a specific signal character, then the entered information is complete and may either be left where it has been assembled in memory, or moved to other locations ready for use by the control program in carrying out further operations.

Once the user signals that all information (or at least this piece of it) has been entered, the apparatus is done as indicated in step 512 with receiving the entered numeric identifier and with typical programming the entered identifier is now completely stored in memory as a string of characters as indicated in step 511.

Other "escape" mechanisms or alternative data entry mechanisms might be incorporated into this or similar data entry methods while still providing added security from covert observation from the application of the method of the present invention.

Other random delays could be introduced between or during other steps in implementation of a method for obtaining user input which would add a benefit of security from covert observation in the manner of the method of the present invention. For example, after some random number of suggested characters, a potentially longer random period of delay could be introduced, which would make the input procedure pause for a moment. The user could either "wait" for the end of this delay after which time the changing of suggested characters would begin again, or if the user releases the keys and then presses them again, the changing of suggested characters would begin again.

Figure 6:
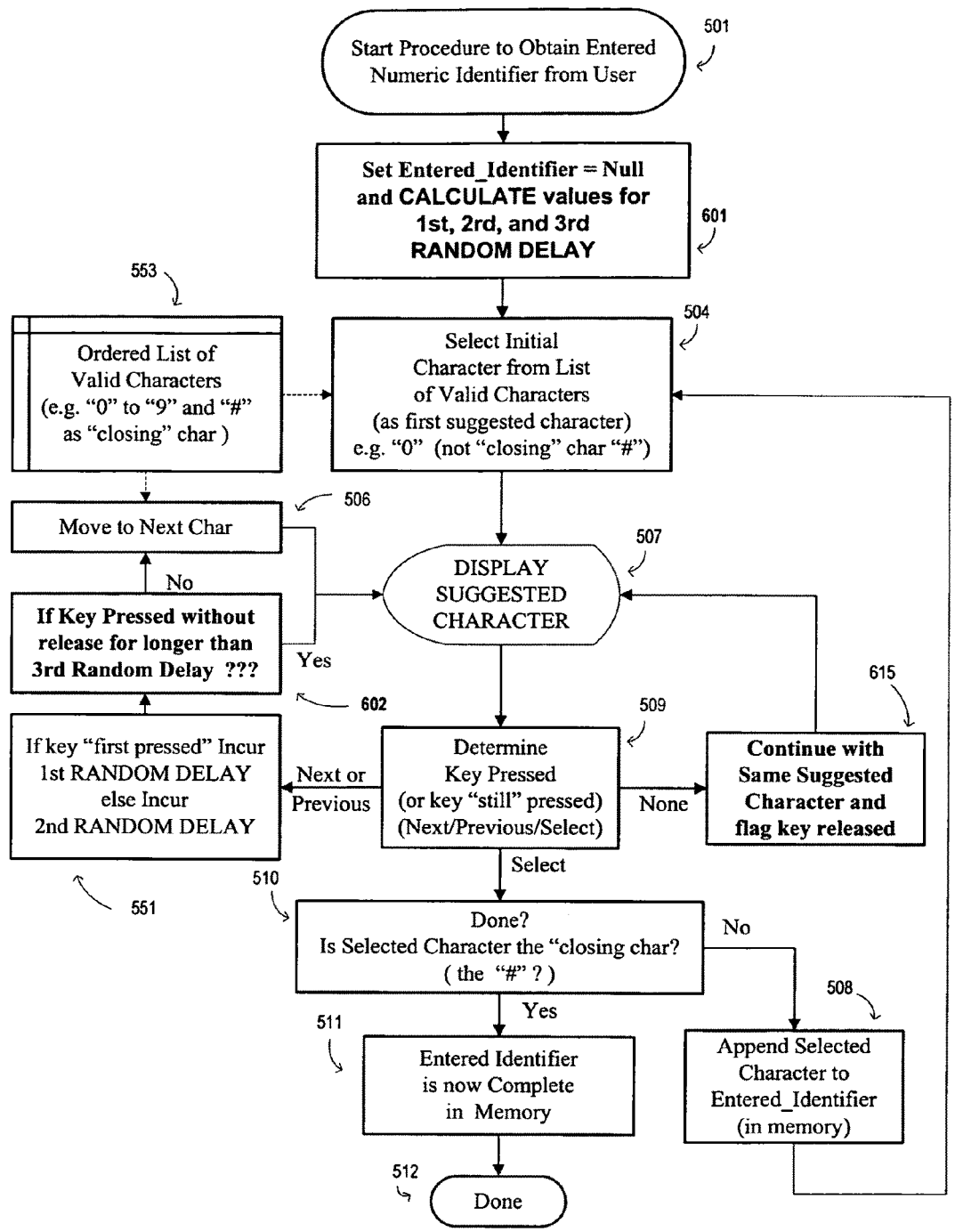
FIG. 6 is a flow chart diagramming steps of the method of another illustrated embodiment of the present invention that controls an input apparatus during data entry which provides enhanced security during the data entry by including additional or alternative randomization in the required timing of key presses or key movement to achieve the user's desired input, and which further randomizes user input by cancelling the further effect of any current key press after a random interval, which requires a user to release any currently pressed key in order to continue data entry.

A general flow diagram of another similar approach is provided in FIG. 6 and is exemplary of the many ways in which randomization of the input process could be accomplished based upon random timing between or during various steps of the overall input method.

FIG. 6 contains steps similar to the steps illustrated in FIG. 5. The added or changed steps are marked by reference numbers 601, 602 and 615. The basis for the added steps is to insert random pauses into the "reaction" time by apparatus of the input apparatus. That is, such steps occasionally force the user to release and again press the keys or buttons in order to continue signaling the apparatus to change the suggested character for data entry, or to signal the selection of the currently suggested character as a desired input character. The period between these random "pauses" is calculated in step 601 during initialization. An approximate value for this delay time might be a number that would approximate the time for a user to move through some reasonable number of suggested characters such as ten. There are no absolute restrictions on this time period (3rd random delay). The delay period and all of the random delays could also be immediately recalculated each time one of the random values is "used". This may affect the ease of use of the input apparatus by making it react in a less predictable manner, and thus selection of the ranges of values for the 1st, 2nd and 3rd random delays should be chosen keeping in mind that some ranges or combinations might be less usable or even annoying to the user in actual practice.

It is further noted that an approach similar to randomly "resetting" the input process so the user has to restart "movement" of the suggested characters, could also be used for an input scheme with no automated "movement" of suggested characters, that is, an approach which requires at least one key press for each change in suggested character. This approach could be randomized by randomly ignoring some key presses so that the number of key presses is not directly indicative of the number of changes in suggested character for data entry.

Another alternative which allows use of keys in manner similar to the wheel would be to start continued movement with a press of a key and stop it with another press. If the interval or intervals between changing of suggested characters is randomized in some way, then this allows the initially suggested character to be fixed, or predictable while still providing the randomness that prevents determination of input information through covert observation of the user's input actions.

Any randomness of timing in the display of the suggested characters for data entry or random alteration of response to user input serves to mask determination of user input information through covert observation of the user's input actions. These and other similar means of randomization can be applied in combination or individually with the choice being made by a skilled designer of the input apparatus and/or the control program sequence which controls any associated input apparatus.

Figure 7:
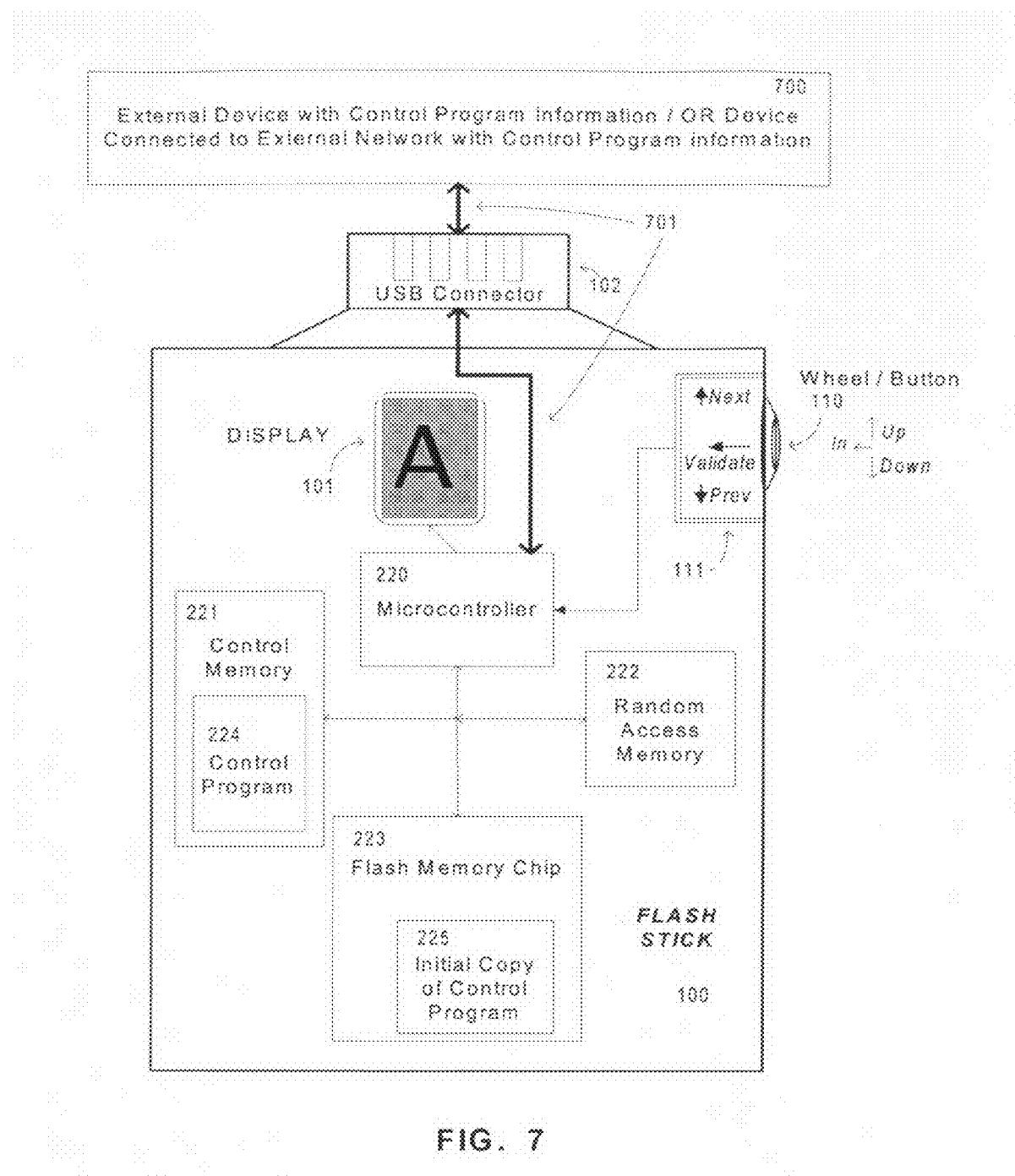
FIG. 7 is a diagram illustrating a flash memory stick with a microcontroller and a USB connection that allows for downloading of a control program into the flash stick from an external network or external device to which the flash memory stick is connected.

FIG. 7 is a diagram illustrating a flash memory stick 100 that includes a microcontroller 220 and a USB connection 102 that allows for the downloading of a control program for storage in the flash stick 100 from an external network or device to which the flash memory stick 100 is connected. As shown, the Flash Stick 100 has a control program 224 which controls operation of the flash stick apparatus 100 and the USB interconnection. The microcontroller 220 is operatively coupled to the USB Connector 102 which provides for a connection 701 through the USB Connector 102 to an external network or device 700. The control program 224 provides for downloading of a new control program through the USB connector 102 into the flash stick device 100. This operation is often called downloading new "firmware" or "updating the firmware" of the flash stick device 100, such terms being common in the art. While operating in a control sequence receptive to update, a new control program source is located which with the new program contained on a storage device of an external computer, or computer server. This new control program is downloaded into the flash stick device 100 through connection 701, the USB connector 102 and the control program then replaces itself with a new control program. Starting the new control program may require a "reboot" of the device, or a special restart of the control program. Methods for an update operation similar to this approach could be designed by those skilled in the art.

Other means, methods or apparatus to improve security from covert observation, by randomly affecting the required timing for the user to input characters as described in the exemplary illustrated embodiments(s), or by randomly ignoring or responding to certain or repeated user input in unpredictable ways while still providing for convenient user input of user information could be devised by those skilled in the art.

What is claimed is:

1. A secure method enabling a user of an apparatus to enter user private information through a sequence of user input actions, the method comprising the following steps:
   A) the apparatus providing to the user a plurality of character input steps, each step of the plurality of character input steps providing for entering a user chosen input character as part of the user private information, each character input step comprising:
      a) selection by the apparatus of a character and presenting the character to the user as a currently suggested input character
      b) in response to a first user input action, the apparatus changing the currently suggested input character to a different character, and presenting that different character to the user as the currently suggested input character; and
      c) in response to a second user input action, the apparatus utilizing the currently suggested input character part of the private information being entered, and,
   B) during the entering of the user private information, the apparatus introducing a plurality of random periods of delay in which any one or more of the first user input actions occurring during any one of those random periods of delay are ignored by the apparatus, thus altering and making unpredictable, the sequence of user input actions required for entering the user private information and making observation of the sequence of user input actions of reduced benefit to a covert observer in obtaining such private information.

2. A secure method enabling a user of an apparatus to enter user private information through a sequence of user input actions, the method including a plurality of character input steps, each step of the plurality of character input steps providing for entering a user chosen input character as part of the user private information, each character input step comprising:
   a) selection by the apparatus of a character and presenting the character to the user as a currently suggested input character
   b) in response to a first user input action, the apparatus introducing unpredictability into the sequence of user actions for entering the user desired private information by selecting randomly between the following two possible steps:

1) changing the currently suggested input character to a new character, and presenting that new-character to the user as the currently suggested input character, and, 2) disregarding the first user input action; and, c) in response to a second user input action, the apparatus utilizing the currently suggested input character as part of the private information being entered.

3. A secure method enabling a user of an apparatus to enter private information through a sequence of user input actions, the method comprising the following steps:

A) the apparatus providing to the user a plurality of character input steps, each step of the plurality of character input steps providing for entering a user chosen input character as part of the user private information, each character input step comprising:

a) selection by the apparatus of a character and presenting the character to the user as a currently suggested input character b) in response to a first user input action, the apparatus determining and then changing at a periodic rate of change the currently suggested character to a different currently suggested input character; and, c) in response to a second user input action, the apparatus utilizing the currently suggested character as a part of the private information being entered and, B) the apparatus introducing unpredictability into the sequence of user input actions necessary for entering the user private information by randomly setting the periodic rate of change in the currently suggested input character presented to the user thus altering the sequence of user input actions necessary for entering user private information and for making observation of the sequence of user input actions of reduced benefit to a covert observer in determining such user private information.

4. A secure method enabling a user of an apparatus to enter private information including a string of characters, the method the following steps:

A) the apparatus providing to the user a plurality of character input steps for entering user chosen input characters, each chosen input character selected from a set of possible input characters, each character input step comprising the substeps of:

a) selection by the apparatus of a character from the set of possible input characters and the apparatus presenting the character to the user, after a randomized interval of delay, as a currently suggested character;

b) in response to a first user input action, the apparatus changing the currently suggested input character to a different character, and presenting that different character to the user as the currently suggested input character; and, c) in response to a second user input action, the apparatus then utilizing the user chosen input character as part of the private information being entered, and, B) the apparatus introducing unpredictability into the sequence of user input actions necessary for entering the user private information by introducing during the entering of the user private information, a plurality of randomized intervals of delay in which any one or more first user input actions occurring during any one of those randomized intervals of delay are ignored by the apparatus, thus altering the sequence of user input actions necessary for entering user private information and for making observation of the sequence of user input actions of reduced benefit to a covert observer in determining such user private information.

5. A secure method enabling a user of an apparatus to enter user desired private information through a sequence of user input actions, the method comprising the following steps:

A) the apparatus providing to the user a plurality of character input steps, each character input step for entering a user chosen input character as part of the user private information and comprising:

a) selection by the apparatus of character and presenting the character to the user as a currently suggested input character b) in response to a first user input action, the apparatus selecting randomly between the following two possible steps:

1) changing the currently suggested input character to a new character, and presenting that new character to the user as the currently suggested input character, and, 2) disregarding the first user input action; and, c) in response to a second user input action, the apparatus selecting randomly one of the following two possible steps:

1) the apparatus utilizing the currently input suggested character as part of the private information being entered, and 2) disregarding the second user input action; and, B) the apparatus introducing unpredictability into the sequence of user input actions necessary for entering the user private information by introducing randomizing the apparatus response to the first user input action, thus altering the sequence of user input actions necessary for entering user private information and for making observation of the sequence of user input actions of reduced benefit to a covert observer in determining such user private information.

6. An apparatus with a control mechanism for performing the steps of a secure method to be utilized by a user of the apparatus in entering user private information, the private information including a string of characters, the secure method comprising the following steps:

A) the apparatus providing to the user a plurality of character input steps, each character input step providing for entering a user chosen input character from a predefined list of eligible characters as part of the user private information, and comprising:

a) selection by the apparatus of a character and presenting the character to the user as a currently suggested input character b) in response to a first user input action, and after a random period of delay, the apparatus changing the currently suggested input character to a new character, and presenting that new character to the user as the currently suggested input character; and, c) in response to a second user input action, the apparatus utilizing the currently suggested input character as part of the private information being entered, and, B) the apparatus introducing unpredictability into the sequence of user input actions necessary for entering the user private information by introducing during the entering of the user private information, a plurality of random periods of delay in which any one or more first user input actions occurring during any one of those random periods of delay are ignored by the apparatus, thus altering the sequence of user input actions necessary for entering user private information and for making observation of the sequence of user input actions of reduced benefit to a covert observer in determining such user private information.

7. The apparatus of claim 6 in which the user desired private information is used to verify the user's right to access the apparatus.

8. The apparatus of claim 6 wherein the apparatus is operatively coupled to an external device which stores instructions of a program product and the steps of the secure method are performed by the apparatus in response to program code instructions of the program product downloaded to the apparatus from the external device.

9. The apparatus of claim 6 wherein the apparatus is operatively coupled to an external network and the steps of the secure method are performed by the apparatus in response to program code instructions of a program product downloaded to the apparatus from the external network.

10. A computer program product stored on a computer-readable non-transitory media, characterized in that it comprises program code instructions for implementing a secure method for entering an identifier comprising a plurality of characters, the secure method comprising the following steps:
   A) providing a character input step for entering one input character as part of the identifier and repeating the character input step until all the characters of the identifier have been entered, the computer program product including program code instructions for carrying out each character input step comprising the following sub-steps:
      a) selecting a character and presenting the character to a user as a currently suggested input character;
      b) in response to a first user input action, and after a random period of delay, changing the currently suggested input character to a new character, and presenting that new character to the user as the currently suggested input character; and,
      c) in response to a second user input action, utilizing the currently suggested input character as part of the identifier being entered, and,
   B) the secure method introducing unpredictability into the sequence of user input actions necessary for entering the user private information by introducing during the entering of the user private information, a plurality of random periods of delay in which any one or more first user input actions occurring during any one of those random periods of delay are ignored, thus altering the sequence of user input actions necessary for entering user private information and for making observation of the sequence of user input actions of reduced benefit to a covert observer in determining such user private information.

11. A computer program product stored on a computer-readable non-transitory media, characterized in that it comprises program code instructions for implementing a secure method for entering an identifier comprising a plurality of characters, the secure method comprising the following steps:
   A) providing a character input step for entering one input character as part of the identifier and repeating the character input step until all the characters of the identifier have been entered, the computer program product including program code instructions for carrying out each character input step comprising the following sub-steps:
      a) selecting a character and presenting the character to a user as a currently suggested input character;
      b) in response to a first user input action, randomly selecting between:
         1) changing the currently suggested input character to a new character, and presenting that new character to the user as the currently suggested input character, and,
         2) disregarding the first user input action; and
      c) in response to a second user input action, utilizing the currently suggested input character as part of the identifier being entered, and,
   B) the secure method introducing unpredictability into the sequence of user input actions necessary for entering the user private information by introducing during the entering of the user private information, a plurality of random periods of delay in which any one or more first user input actions occurring during any one of those random periods of delay are ignored, thus altering the sequence of user input actions necessary for entering user private information and for making observation of the sequence of user input actions of reduced benefit to a covert observer in determining such user private information.

* * * * *